(12) United States Patent
Xiong et al.

(10) Patent No.: US 7,808,803 B2
(45) Date of Patent: Oct. 5, 2010

(54) INVERTER CIRCUIT WITH TRANSFORMER HAVING BALANCEABLE INPUT CURRENTS

(75) Inventors: Jin-Liang Xiong, Shenzhen (CN); Tong Zhou, Shenzhen (CN); Jian-Hui Lu, Shenzhen (CN); Kun Le, Shenzhen (CN)

(73) Assignees: Innocom Technology (Shenzhen) Co., Ltd., Shenzhen, Guangdong Province (CN); Chimel Innolux Corporation, Miao-Li County (TW)

( * ) Notice: Subject to any disclaimer, the term of this patent is extended or adjusted under 35 U.S.C. 154(b) by 444 days.

(21) Appl. No.: 11/982,968

(22) Filed: Nov. 5, 2007

(65) Prior Publication Data
US 2008/0106920 A1      May 8, 2008

(30) Foreign Application Priority Data
Nov. 3, 2006    (TW)  ............................... 95140736 A
Dec. 1, 2006    (TW)  ............................... 95144733 A

(51) Int. Cl.
*H02M 7/538*  (2007.01)
(52) U.S. Cl. .......................................... 363/134; 363/26
(58) Field of Classification Search ................... 363/24, 363/25, 26, 134
See application file for complete search history.

(56) References Cited

U.S. PATENT DOCUMENTS

| 3,660,751 | A | * | 5/1972 | Bullinga | 363/26 |
|---|---|---|---|---|---|
| 3,683,208 | A | * | 8/1972 | Burens | 323/312 |
| 3,706,022 | A | * | 12/1972 | Corey et al. | 363/24 |
| 3,792,337 | A | * | 2/1974 | Gilmore | 363/25 |
| 3,859,586 | A | * | 1/1975 | Wadlington | 363/25 |
| 3,870,943 | A | * | 3/1975 | Weischedel et al. | 363/26 |
| 4,155,113 | A | * | 5/1979 | Simmons | 363/24 |
| 4,158,785 | A | * | 6/1979 | Desaintfuscien | 327/284 |
| 4,196,320 | A | * | 4/1980 | Townsend | 379/400 |
| 4,210,858 | A | * | 7/1980 | Ford et al. | 323/247 |
| 4,233,658 | A | * | 11/1980 | Lupatin et al. | 363/26 |
| 4,293,902 | A | * | 10/1981 | White | 363/26 |
| 4,301,499 | A | * | 11/1981 | Levinson | 363/26 |
| 4,322,817 | A | * | 3/1982 | Kuster | 363/26 |
| 4,351,020 | A | * | 9/1982 | Leti et al. | 363/26 |
| 4,439,822 | A | * | 3/1984 | Cocconi | 363/56.08 |
| 4,456,950 | A | * | 6/1984 | Cordy, Jr. | 363/26 |
| 4,477,867 | A | * | 10/1984 | Pellegrino | 363/26 |
| 6,954,364 | B2 | | 10/2005 | Min | |

* cited by examiner

*Primary Examiner*—Jeffrey L Sterrett
(74) *Attorney, Agent, or Firm*—Wei Te Chung

(57) ABSTRACT

An exemplary inverter circuit (200) includes a direct current (DC) input terminal (210); a transformer (230) including a first primary winding (231) and a second primary winding (232); a first switch transistor (240); a second switch transistor (250); a pulse generator (260) providing pulse driving signals to the first switch transistor and the second transistor respectively; and a resistor (29). The first primary winding and the second primary winding share a tap (235), the tap is connected to the DC input terminal via the resistor. A drain electrode of the first switch transistor is connected to the tap via the first primary winding, and a drain electrode of the second switch transistor is connected to the tap via the second primary winding.

16 Claims, 3 Drawing Sheets

INVERTER CIRCUIT WITH TRANSFORMER HAVING BALANCEABLE INPUT CURRENTS

FIELD OF THE INVENTION

The present invention relates to inverter circuits, and particularly to an inverter circuit with a transformer having balanceable input currents.

GENERAL BACKGROUND

FIG. 4 is a circuit diagram of a typical inverter circuit. The inverter circuit 100 includes a first direct current (DC) input terminal 110 connected to a first DC power supply (not shown), a second DC input terminal 120 connected to a second DC power supply (not shown), a transformer 130, a first switch transistor 140, a second switch transistor 150, a pulse generator 160, a pulse width modulation (PWM) circuit 170, and a filter circuit 180. The transformer 130 includes a first primary winding 131, a second primary winding 132, and a secondary winding 133. The pulse generator 160 includes an input terminal 161, a first output terminal 162, and a second output terminal 163. The PWM circuit 170 includes an output terminal 171 configured to provide a square pulse. The first and second switch transistors 140, 150 are N-channel metal-oxide-semiconductor field-effect transistors (NMOSFETs).

The first primary winding 131 and the second primary winding 132 share a tap 135. The tap 135 is connected to the first DC input terminal 110.

The first switch transistor 140 includes a source electrode "S", a drain electrode "D", and a gate electrode "G". The source electrode "S" is connected to ground. The drain electrode "D" is connected to the other tap (not labeled) of the first primary winding 131 of the transformer 130. The gate electrode "G" is connected to the first output terminal 162 of the pulse generator 160.

The second switch transistor 150 includes a source electrode "S", a drain electrode "D", and a gate electrode "G". The source electrode "S" is connected to ground. The drain electrode "D" is connected to the other tap (not labeled) of the second primary winding 132 of the transformer 130. The gate electrode "G" is connected to the second output terminal 163 of the pulse generator 160.

The input terminal 161 of the pulse generator 160 is connected to the output terminal 171 of the PWM circuit 170 for receiving the square pulse. The pulse generator 160 generates two pulse driving signals with opposite phases according to the received square pulse, and provides the two pulse driving signals to the first switch transistor 140 and the second switch transistor 150, respectively.

The second DC input terminal 120 provides operation voltages to the pulse generator 160 and the PWM circuit 170 respectively. The filter circuit 180 connects between the tap 135 and ground. The filter circuit 180 includes a resistor (not labeled) and a capacitor (not labeled) connected in series.

When the pulse driving signal at the first output terminal 162 of the pulse generator 160 is a high level voltage and the pulse driving signal at the second output terminal 163 of the pulse generator 160 is a low level voltage, the first switch transistor 140 is turned on and the second switch transistor 150 is turned off. Thus a first current path is formed sequentially through the first DC input terminal 110, the tap 135, the first primary winding 131 of the transformer 130, and the first switch transistor 140. A first current is formed when the first DC power supply provided to the first DC input terminal 110 is connected to ground via the first current path. The first current flowing through the first current path linearly increases until the electromagnetic induction generated in the first primary winding 131 reaches a predetermined maximum threshold.

When the pulse driving signal at the first output terminal 162 of the pulse generator 160 is a low level voltage and the pulse driving signal at the second output terminal 163 of the pulse generator 160 is a high level voltage, the first switch transistor 140 is turned off and the second switch transistor 150 is turned on. Thus a second current path is formed sequentially through the first DC input terminal 110, the tap 135, the second primary winding 132 of the transformer 130, and the second switch transistor 150. A second current is formed when the first DC power supply provided to the first DC input terminal 110 is connected to ground via the second current path. The second current flowing through the second current path linearly increases until the electromagnetic induction generated in the second primary winding 132 reaches a predetermined maximum threshold.

When current flows through the first primary winding 131 or the second primary winding 132, electromagnetic induction at the secondary winding 133 generates an alternating current (AC) voltage between two taps (not labeled) of the secondary winding 133. The AC voltage is used for driving a load (not shown). The load may for example be lamps (not shown) of a backlight module of a liquid crystal display device. When the lamps are driven, they light up.

The circuit configuration of the inverter circuit 100 is completely symmetrical, thus the parameters of the same electronic elements of the inverter circuit 100 (e.g. the first switch transistor 140 and the second switch transistor 150) must be the same. But in fact, the parameters of the same electronic elements of the inverter circuit 100 are a little different, due to permissible variation (tolerance) in the specification for the electronic element. For example, a resistance between a source electrode and a drain electrode of a transistor is 30±5 milliohms (mΩ) according to the specification for the transistor. When a resistance between the source electrode "S" and the drain electrode "D" of the first switch transistor 140 is 35 mΩ, and a resistance between the source electrode "S" and the drain electrode "D" of the second switch transistor 150 is 25 mΩ, the current flowing through the first primary winding 131 of the transformer 130 is smaller than the current flowing through the second primary winding 132 of the transformer 130.

FIG. 5 is a waveform diagram of current flowing through the tap 135 of the transformer 130. $Vg_1$ and $Vg_2$ represent the pulse driving signal at the output terminal 162 of the pulse generator 160 and the pulse driving signal at the output terminal 163 of the pulse generator 160, respectively.

During a time $t_1$, $Vg_1$ is a low level voltage and $Vg_2$ is a high level voltage (i.e. the first switch transistor 140 is turned off and the second switch transistor 150 is turned on), and the second current flows through the tap 135 of the transformer 130. The second current linearly increases and finally reaches a maximum current $I_1$.

During a time $t_2$, $Vg_2$ turns to a low level voltage (i.e. the second switch transistor 150 is turned off), and the second current reverses instantaneously. Then the reversed second current linearly increases and but does not reach zero in time $t_2$.

During a time $t_3$, $Vg_1$ turns to a high level voltage (i.e. the first switch transistor 140 is turned on), and the first current flows through the tap 135 of the transformer 130. The first current firstly counteracts the reversed second current of the transformer 130, i.e., a mixed current flowing through the tap 135 firstly reaches zero. Then the first current linearly increases and finally reaches a maximum current $I_2$. The difference between the maximum current $I_1$ and the maximum current $I_2$ is 0.6 A.

During a time $t_4$, $Vg_1$ turns to a low level voltage (i.e. the first switch transistor 140 is turned off), and the first current flowing through the tap 135 reverses instantaneously. The reversed first current then linearly increases. Because the reversed first current is smaller than the reversed second current, the reversed first current increases to zero in time $t_4$.

Then the inverter circuit 100 repeats the above process. We can conclude that when the resistance between the source electrode "S" and the drain electrode "D" of the first switch transistor 140 is larger than the resistance between the source electrode "S" and the drain electrode "D" of the second switch transistor 150, and the first current is smaller than the second current. A temperature of the second primary winding 132 is higher than a temperature of the first primary winding 131. Thus the transformer 130 may become damaged or even destroyed after working for a long time.

When the resistance between the source electrode "S" and the drain electrode "D" of the first switch transistor 140 is smaller than the resistance between the source electrode "S" and the drain electrode "D" of the second switch transistor 150, the above-described problem also exists.

It is desired to provide a new inverter circuit which can overcome the above-described deficiencies.

SUMMARY

In one preferred embodiment, an inverter circuit includes a DC input terminal connected to a DC power supply; a transformer including a first primary winding, a second primary winding, and a secondary winding for outputting an alternating current voltage; a pulse generator including a first output terminal and a second output terminal; a first switch transistor including a source electrode connected to ground, a gate electrode connected to the first output terminal of the pulse generator, and a drain electrode; a second switch transistor including a source electrode connected to ground, a gate electrode connected to the second output terminal of the pulse generator, and a drain electrode; and a resistor. The first primary winding and the second primary winding share a tap. The resistor is connected between the direct current input terminal and the tap. The drain electrode of the first switch transistor is connected to the tap via the first primary winding, and the drain electrode of the second switch transistor is connected to the tap via the second primary winding.

In another preferred embodiment, an inverter circuit includes a DC input terminal connected to a DC power supply; a transformer including a first primary winding, a second primary winding, and a secondary winding for outputting an alternating current voltage; a first switch transistor; a second switch transistor; a pulse generator including a first output terminal and a second output terminal; a first resistor connected to the first primary winding; and a second resistor connected to the second primary winding. The drain electrode of the first switch transistor is connected to the direct current input terminal via the first primary winding and the first resistor, and the drain electrode of the second switch transistor is connected to the direct current input terminal via the second primary winding and the second resistor.

Other novel features and advantages of the inverter circuit will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail.

Figure 1:
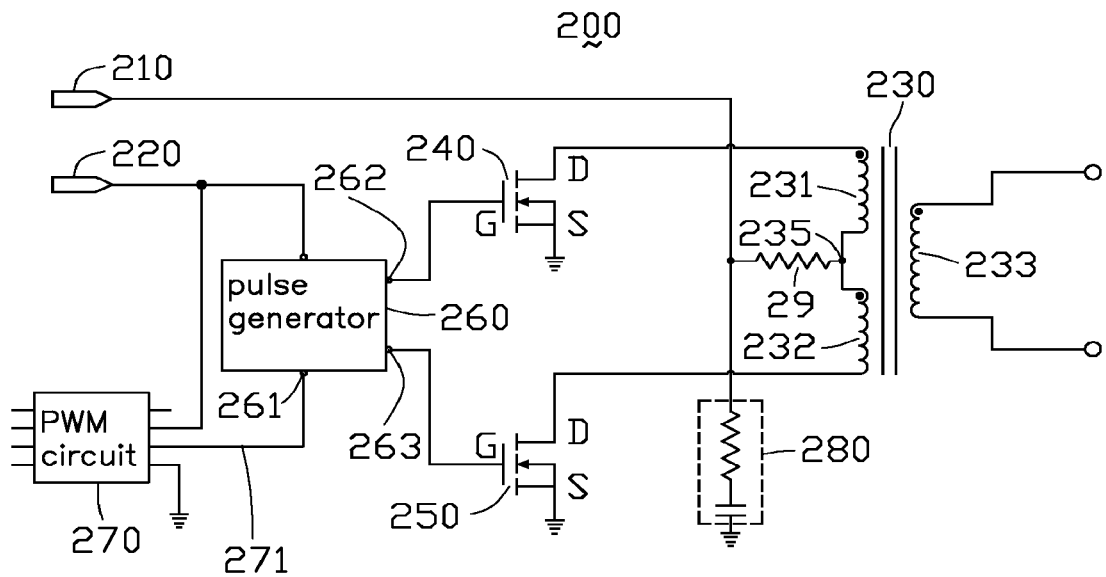
FIG. 1 is a circuit diagram of an inverter circuit according to a first embodiment of the present invention.

FIG. 1 is a circuit diagram of an inverter circuit according to a first embodiment of the present invention. The inverter circuit 200 includes a first DC input terminal 210 connected to a first DC power supply (not shown), a second DC input terminal 220 connected to a second DC power supply (not shown), a transformer 230, a first switch transistor 240, a second switch transistor 250, a pulse generator 260, a PWM circuit 270, and a resistor 29. The transformer 230 includes a first primary winding 231, a second primary winding 232, and a secondary winding 233. The pulse generator 260 includes an input terminal 261, a first output terminal 262, and a second output terminal 263. The PWM circuit 270 includes an output terminal 271 configured to provide a square pulse. The first and second switch transistors 240, 250 are NMOSFETs.

The first primary winding 231 and the second primary winding 232 share a tap 235. The tap 235 connects to the first DC input terminal 210 via the resistor 29.

The first switch transistor 240 includes a source electrode "S", a drain electrode "D", and a gate electrode "G". The source electrode "S" is connected to ground. The drain electrode "D" is connected to the other tap (not labeled) of the first primary winding 231 of the transformer 230. The gate electrode "G" is connected to the first output terminal 262 of the pulse generator 260.

The second switch transistor 250 includes a source electrode "S", a drain electrode "D", and a gate electrode "G". The source electrode "S" is connected to ground. The drain electrode "D" is connected to the other tap (not labeled) of the second primary winding 232 of the transformer 230. The gate electrode "G" is connected to the second output terminal 263 of the pulse generator 260.

The input terminal 261 of the pulse generator 260 is connected to the output terminal 271 of the PWM circuit 270 for receiving the square pulse. The pulse generator 260 generates two pulse driving signals with opposite phases according to the received square pulse, and provides the two pulse driving signals to the first switch transistor 240 and the second switch transistor 250, respectively.

The second DC input terminal 220 provides operation voltages to the pulse generator 260 and the PWM circuit 270, respectively. The filter circuit 280 is connected between the first DC input terminal 210 and ground. The filter circuit 280 includes a resistor (not labeled) and a capacitor (not labeled) connected in series.

A range of a resistance of the resistor 29 is 100 mΩ~400 mΩ. In this embodiment, a value of 200 mΩ is preferred. The circuit configuration of the inverter circuit 200 is completely symmetrical, thus the parameters of the same electronic elements of the inverter circuit 200 (e.g. the first switch transistor 240 and the second switch transistor 250) must be the same. But in fact, the parameters of the same electronic elements of the inverter circuit 200 are a little different, due to permissible variation (tolerance) in the specification for the electronic element. For example, a resistance between a source electrode and a drain electrode of a transistor may be 30±5 mΩ according to the specification for the transistor. Thus a resistance between the source electrode "S" and the drain electrode "D" of the first switch transistor 240 may be 35 mΩ, and a resistance between the source electrode "S" and the drain electrode "D" of the second switch transistor 250 may be 25 mΩ.

When the pulse driving signal at the first output terminal 262 of the pulse generator 260 is a high level voltage and the pulse driving signal at the second output terminal 263 of the pulse generator 260 is a low level voltage, the first switch transistor 240 is turned on and the second switch transistor 250 is turned off. Thus a first current path is formed sequentially through the first DC input terminal 210, the resistor 29, the tap 235, the first primary winding 231 of the transformer 230, and the first switch transistor 240. A first current is formed when the first DC power supply provided to the first DC input terminal 210 is connected to ground via the first current path. The first current flowing through the first current path linearly increases until the electromagnetic induction generated in the first primary winding 231 reaches a predetermined maximum threshold.

When the pulse driving signal at the first output terminal 262 of the pulse generator 260 is a low level voltage and the pulse driving signal at the second output terminal 263 of the pulse generator 260 is a high level voltage, the first switch transistor 240 is turned off and the second switch transistor 250 is turned on. Thus a second current path is formed sequentially through the first DC input terminal 210, the resistor 29, the tap 235, the second primary winding 232 of the transformer 230, and the second switch transistor 250. A second current is formed when the first DC power supply provided to the first DC input terminal 210 is connected to ground via the second current path. The second current flowing through the second current path linearly increases until the electromagnetic induction generated in the second primary winding 232 reaches a predetermined maximum threshold.

When current flows through the first primary winding 231 or the second primary winding 232, electromagnetic induction at the secondary winding 233 generates an alternating current (AC) voltage between two taps (not labeled) of the secondary winding 233. The AC voltage is used for driving a load (not shown). The load may for example be lamps (not shown) of a backlight module of a liquid crystal display device. When the lamps are driven, they light up.

Figure 2:
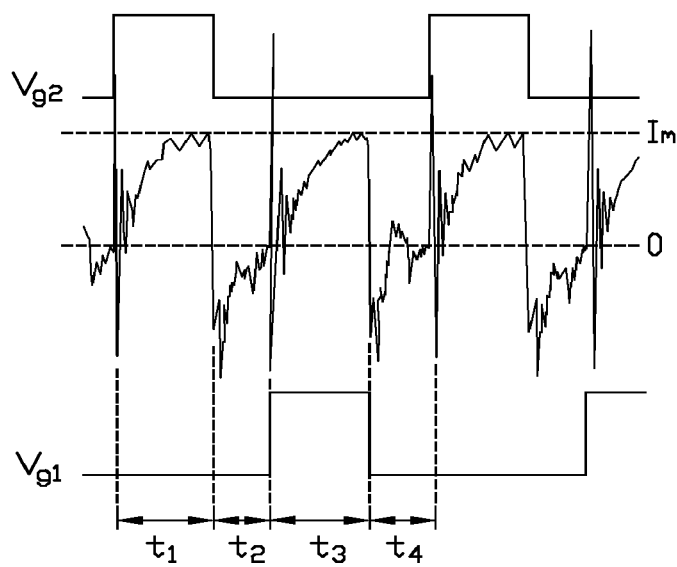
FIG. 2 is a waveform diagram of current flowing through a tap of a transformer of the inverter circuit of FIG. 1.

FIG. 2 is a waveform diagram of current flowing through the tap 235 of the transformer 230. $Vg_1$ and $Vg_2$ represent the pulse driving signal at the output terminal 262 of the pulse generator 260 and the pulse driving signal at the output terminal 263 of the pulse generator 260, respectively.

During a time $t_1$, $Vg_1$ is a low level voltage and $Vg_2$ is a high level voltage (i.e. the first switch transistor 240 is turned off and the second switch transistor 250 is turned on), and the second current flows through the tap 235 of the transformer 230. The second current linearly increases and finally reaches a maximum current $I_m$.

During a time $t_2$, $Vg_2$ turns to a low level voltage (i.e. the second switch transistor 250 is turned off), and the second current reverses instantaneously. The reversed second current linearly increases to zero in time $t_2$.

During a time $t_3$, $Vg_1$ turns to a high level voltage (i.e. the first switch transistor 240 is turned on), and the first current flows through the tap 235 of the transformer 230. The first current linearly increases and finally reaches the maximum current $I_m$.

During a time $t_4$, $Vg_1$ turns to a low level voltage (i.e. the first switch transistor 240 is turned off), and the first current flowing through the tap 235 reverses instantaneously. The reversed first current linearly increases to zero in time $t_4$.

Then the inverter circuit 200 repeats the above process. Importantly, the inverter circuit 200 has the resistor 29 connected between the first DC input terminal 210 and the tap 235 of the transformer 230. The resistance of the resistor 29 is far greater than the resistance between the source electrode "S" and the drain electrode "D" of the first switch transistor 240, and far greater than the resistance between the source electrode "S" and the drain electrode "D" of the second switch transistor 250. Thus the sum resistance of the first current path is approximately equal to the sum resistance of the second current path, and the maximum current of the two current paths is approximately equal. That is, the transformer 230 has balanceable input currents.

Figure 3:
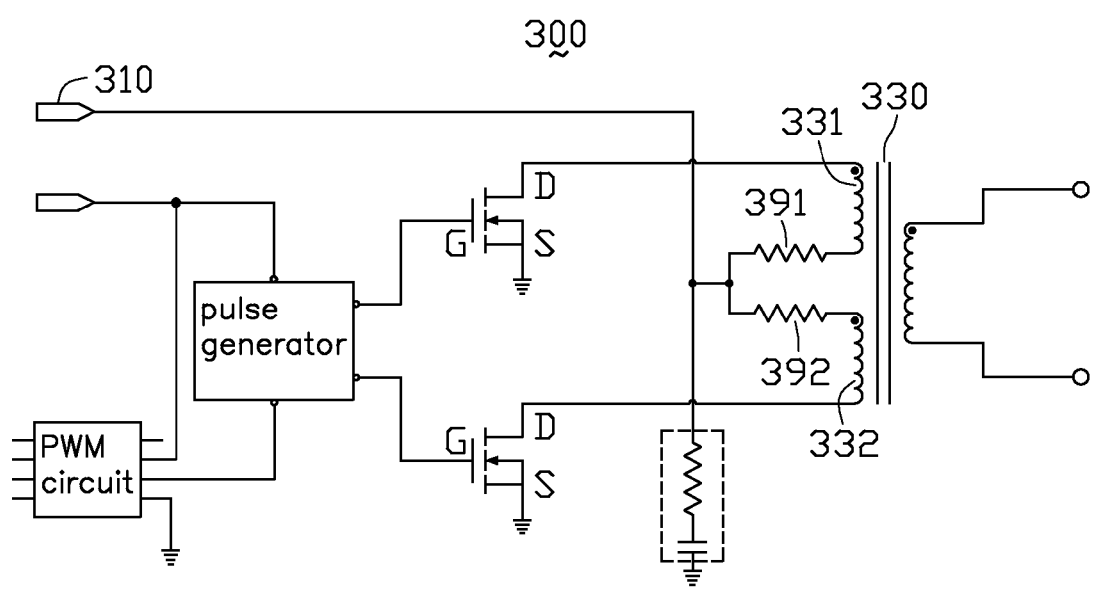
FIG. 3 is a circuit diagram of an inverter circuit according to a second embodiment of the present invention.
Figure 4:
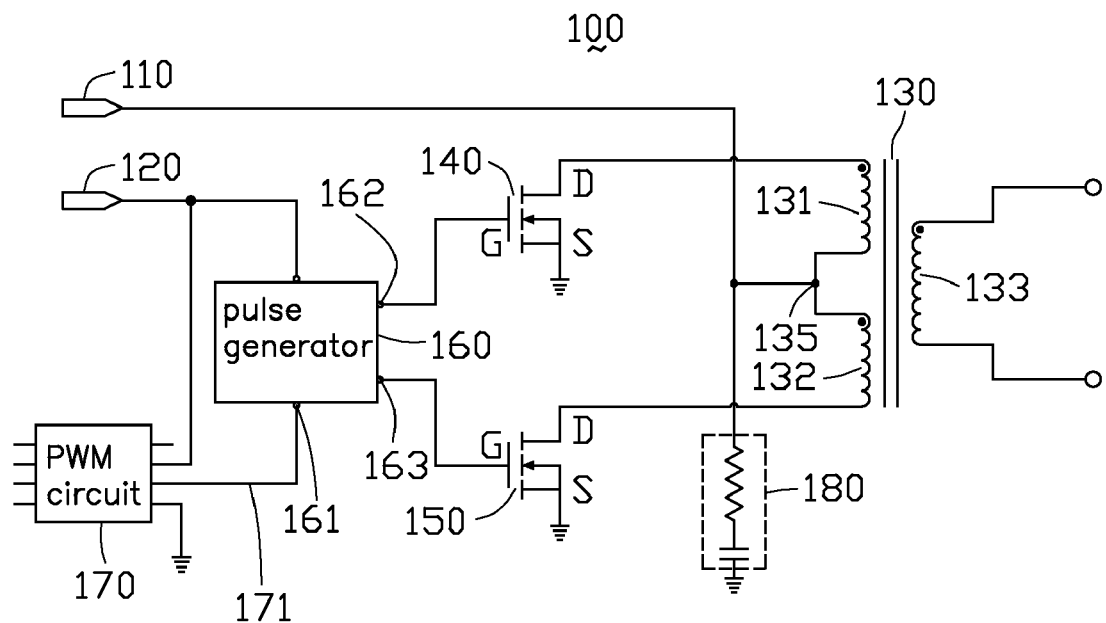
FIG. 4 is a circuit diagram of a conventional inverter circuit.
Figure 5:
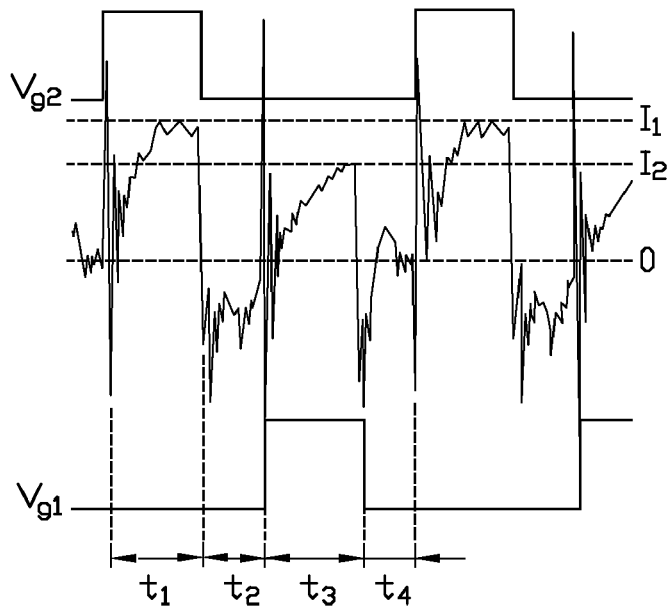
FIG. 5 is a wavefrom diagram of current flowing through a tap of a transformer of the inverter circuit of FIG. 4.

FIG. 3 is a circuit diagram of an inverter circuit according to a second embodiment of the present invention. The inverter circuit 300 is similar to the inverter circuit 200. However, a unique characteristic of the inverter circuit 300 is that the inverter circuit 300 includes a first resistor 391 and a second resistor 392. A range of a resistance of the first resistor 391 is 100 mΩ~400 mΩ, and a range of a resistance of the second resistor 392 is 100 mΩ~400 mΩ. The first resistor 391 is connected between a first primary winding 331 and a first DC input terminal 310, and the second resistor 392 is connected between a second primary winding 332 and the first DC input terminal 310. The first resistor 391 and the second resistor 392 can regulate the sum resistance of the first current path and the second current path respectively. Thus the sum resistance of the first current path can be equal to the sum resistance of the second current path, and the maximum current of the two current paths can be equal. That is, a transformer 330 has balanceable input currents.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. An inverter circuit comprising:
a direct current input terminal configured to be connected to a direct current power supply;
a transformer comprising a first primary winding, a second primary winding, and a secondary winding for outputting an alternating current voltage;
a pulse generator comprising a first output terminal and a second output terminal;

a first switch transistor comprising a source electrode connected to ground, a gate electrode connected to the first output terminal of the pulse generator, and a drain electrode;

a second switch transistor comprising a source electrode connected to ground, a gate electrode connected to the second output terminal of the pulse generator, and a drain electrode; and a resistor;

wherein the first primary winding and the second primary winding share a tap, the tap is connected to the direct current input terminal via the resistor, the drain electrode of the first switch transistor is connected to the tap via the first primary winding, and the drain electrode of the second switch transistor is connected to the tap via the second primary winding, the resistance of the resistor being far greater than the resistance between the source electrode and the drain electrode of the first switch transistor, and far greater than the resistance between the source electrode and the drain electrode of the second switch transistor.

2. The inverter circuit as claimed in claim 1, wherein a resistance of the resistor is in a range of 100 mΩ~400 mΩ.

3. The inverter circuit as claimed in claim 2, wherein the resistance of the resistor is approximately 200 mΩ.

4. The inverter circuit as claimed in claim 1, further comprising a filter circuit connected between the tap and ground.

5. The inverter circuit as claimed in claim 4, wherein the filter circuit comprises a resistor and a capacitor connected in series.

6. The inverter circuit as claimed in claim 1, further comprising a pulse width modulation circuit configured to provide a square pulse to the pulse generator.

7. The inverter circuit as claimed in claim 6, further comprising another direct current input terminal configured to be connected to another direct current power supply and provide operation voltages to the pulse generator and the pulse width modulation circuit, respectively.

8. An inverter circuit comprising:

a direct current input terminal configured to be connected to a direct current power supply;

a transformer comprising a first primary winding, a second primary winding, and a secondary winding for outputting an alternating current voltage;

a pulse generator comprising a first output terminal and a second output terminal;

a first switch transistor comprising a source electrode connected to ground, a gate electrode connected to the first output terminal of the pulse generator, and a drain electrode;

a second switch transistor comprising a source electrode connected to ground, a gate electrode connected to the second output terminal of the pulse generator, and a drain electrode;

a first resistor connected to the first primary winding; and a second resistor connected to the second primary winding;

wherein the drain electrode of the first switch transistor is connected to the direct current input terminal via the first primary winding and the first resistor, and the drain electrode of the second switch transistor is connected to the direct current input terminal via the second primary winding and the second resistor, the resistance of the first resistor being far greater than the resistance between the source electrode and the drain electrode of the first switch transistor, the resistance of the second resistor being far greater than the resistance between the source electrode and the drain electrode of the second switch transistor.

9. The inverter circuit as claimed in claim 8, wherein a resistance of the first resistor is in a range of 100 mΩ~400 mΩ.

10. The inverter circuit as claimed in claim 8, wherein a resistance of the second resistor is in a range of 100 mΩ~400 mΩ.

11. The inverter circuit as claimed in claim 8, further comprising a filter circuit connected between the current input terminal and ground.

12. The inverter circuit as claimed in claim 11, wherein the filter circuit comprises a resistor and a capacitor connected in series.

13. The inverter circuit as claimed in claim 8, further comprising a pulse width modulation circuit configured to provide a square pulse to the pulse generator.

14. The inverter circuit as claimed in claim 13, further comprising another direct current input terminal configured to be connected to another direct current power supply and provide operation voltages to the pulse generator and the pulse width modulation circuit respectively.

15. An inverter circuit comprising:

a direct current input terminal configured to be connected to a direct current power supply;

a transformer comprising a first primary winding, a second primary winding, and a secondary winding for outputting an alternating current voltage;

a pulse generator comprising a first output terminal and a second output terminal;

a first switch transistor comprising a source electrode connected to ground, a gate electrode connected to the first output terminal of the pulse generator, and a drain electrode;

a second switch transistor comprising a source electrode connected to ground, a gate electrode connected to the second output terminal of the pulse generator, and a drain electrode; and wherein the first primary winding and the second primary winding are connected to the direct current input terminal via at least one resistor set, the drain electrode of the first switch transistor is connected to the tap at least via the first primary winding, and the drain electrode of the second switch transistor is connected to the tap at least via the second primary winding, the resistance of the resistor set being far greater than the resistance between the source electrode and the drain electrode of the first switch transistor, and far greater than the resistance between the source electrode and the drain electrode of the second switch transistor.

16. The inverter circuit as claimed in claim 15, wherein said resistor set includes either a single resistor which is connected to a tap by the first primary winding and the second primary winding, or pair of parallel resistor respectively connected to the first primary winding and the second primary winding.

* * * * *